United States Patent [19]

Kimura et al.

[11] Patent Number: 4,594,918

[45] Date of Patent: Jun. 17, 1986

[54] WRIST MECHANISM FOR INDUSTRIAL ROBOT

[75] Inventors: Karou Kimura; Junichiro Ogawa, both of Kitakyushu, Japan

[73] Assignee: Kabushiki Kaisha Yaskawa Denki Seisakusho, Kitakyushu, Japan

[21] Appl. No.: 632,801

[22] Filed: Jul. 20, 1984

[30] Foreign Application Priority Data

Dec. 22, 1983 [JP]  Japan ............................ 58-242696

[51] Int. Cl.$^4$ ............................................. F16H 37/00
[52] U.S. Cl. ................................ 74/665 A; 74/479;
403/23; 414/735; 901/15; 901/26; 901/29; 901/49
[58] Field of Search ............... 414/735, 744 A, 744 R, 414/680; 901/14, 15, 23–29, 49, 50; 74/423, 479, 640, 665 A, , 665 B, 665 C, 665 D, 665 E, 665 R; 403/23, 112, 113, 116, 117; 294/86.4

[56] References Cited

U.S. PATENT DOCUMENTS

| | | | |
|---|---|---|---|
| 4,068,536 | 1/1978 | Stackhouse | 901/26 X |
| 4,365,928 | 12/1982 | Baily | 901/29 X |
| 4,499,790 | 2/1985 | Helms | 901/26 X |
| 4,507,046 | 3/1985 | Sugimoto et al. | 414/735 |

FOREIGN PATENT DOCUMENTS 2505239  11/1982  France ................................. 901/26

Primary Examiner—Donald W. Underwood
Attorney, Agent, or Firm—Ladas & Parry

[57] ABSTRACT

In a wrist mechanism of the type that two sets of differential speed reduction devices are provided within a wrist and arranged symmetrically of and perpendicularly to the axis of an arm and that the adjustment of the angle of the wrist and the rotation of a tool are carried out through the differential speed reduction devices, a novel wrist mechanism is provided for preventing a wrist cover from entering into a dead point condition. The wrist mechanism comprises a guide protrusion and a guide. The guide protrusion is provided on the side of a bracket related by one of wrist covers on a wrist portion side, the side being located outside a speed reduction shaft and on the side of the wrist portion relative to the axis of an input shaft. The guide is provided on the inner face of the wrist cover at a point on a locus of the guide protrusion relative to the wrist cover, the point being defined by that at least the axes of a tool rotation shaft and input shafts coincide with each other.

1 Claim, 9 Drawing Figures

WRIST MECHANISM FOR INDUSTRIAL ROBOT

BACKGROUND OF THE INVENTION

The present invention relates to a structure of a wrist having three degrees of freedom for use with an industrial robot.

A wrist coupled to the end of the arm of an industrial robot is required to have suitable motions for carrying out a desired job in three dimensional space. Thus, as shown in FIG. 1, an entire wrist B coupled to an arm A must be rotated in a direction shown by an arrow a, the angle of a tool C mounted on the wrist must be adjusted or tilted as shown by a reference character b, and the tool itself must be rotated as shown by a reference character c. In order to meet the above requirements, three drive shafts must be inserted into the interior of the arm supporting the wrist, so that the outer dimension and weight of the arm disadvantageously increase. Therefore, the applicants of this application together with other coinventors have proposed a new wrist mechanism disclosed in Japanese Utility Model Application No. 58-44671 filed Mar. 26, 1983. The wrist mechanism is provided with two sets of differential speed reduction devices within a wrist. The devices are arranged symmetrically of and perpendicularly to the axis of an arm. The adjustment of the angle of the wrist and the rotation of a tool are carried out through the differential speed reduction devices, so that input axes for the devices can be made slender and hence the arm can be smaller while improving the accuracy of a mechanism.

Such a prior art wrist mechanism will be described with reference to FIG. 2.

Reference number 1 designates an arm, and reference number 2 designates a first input shaft for rotating the whole of a wrist, the first input shaft 2 being coupled to a wrist seat 4 supported by a bearing 3 mounted on the end of the arm 1. Reference number 5 designates a frame integral with the wrist seat 4. Reference number 6 designates a wrist cover having a spherical shape to be divided into two semi-spherical covers 6a and 6b along a line oblique to the axis of the arm 1. The divided covers 6a and 6b may be rotated along a division plane through a bearing 8. Reference number 9 designates a second input shaft passing through the interior of the first input shaft 2 and extending to the interior of the wrist cover 6. Reference number 10 designates a third input shaft passing through the interior of the second input shaft, and reference numbers 11 and 12 designate respective bevel gears coupled to the second and third input shafts. Reference number 13 designates a speed reduction shaft supported by brackets 14, 14 mounted on the frame 5, and arranged within the wrist cover perpendicularly to the shaft axis of the arm. Reference number 15, 16 designate differential speed reduction devices each mounted opposite ends of the speed reduction shaft 13.

The differential speed reduction device 15 comprises an input shaft 15a, a drive wheel 15b, a ball bearing 15c, a flexible ring 15d, a fixed wheel 15e, and an output shaft 15f. The input shaft 15a is rotatably mounted on the speed reduction shaft 13 and has a bevel gear 17 meshing with the bevel gear 11. The drive wheel 15b of an elliptical shape is fixedly connected to the input shaft 15a. The flexible ring 15d has a plurality of spline teeth on the outer periphery thereof, and is slidably mounted on the outer periphery of the drive wheel 15b through the ball bearing 15c. The fixed wheel 15e fixed to the bracket 14 and the output shaft 15f rotatably supported by the bracket 14, are each provided with spline teeth meshing with the spline teeth of the flexible ring 15a and having a number of teeth slightly different from that of the flexible ring 15d. In operation, when the input shaft 15a and hence the drive wheel 15b integral therewith is rotated, the longer diameter side portions of the drive wheel 15b push the flexible ring 15d against the fixed wheel 15e and also against the output shaft 15f to thereby mesh both spline teeth with each other. The meshing portions are moved sequentially along the spline teeth while the flexible ring 15d is driven to rotate. Therefore, the flexible ring 15d is rotated at a lower speed reduced in proportion to the difference of the number of spline teeth from that of the fixed wheel 15e, and the output shaft 15f meshing with the flexible ring 15d is rotated at a lower speed reduced in proportion to the difference of the number of spline teeth therebetween.

The differential speed reduction device 16 is constructed in the same way as that of the above mentioned differential speed reduction device 15, in which an input shaft 16a is provided with a bevel gear 18 which meshes with the third input shaft 10.

Reference number 19 designates a tilting shaft mounted on the wrist cover 6b through a bearing 20. The tilting shaft 19 is aligned to as for the axis thereof to pass the intersection point O between the axes of the arm 1 and the speed reduction shaft 13, and is coupled to the output shaft 15f of the differential speed reduction device 15. Reference number 21 designates a tool rotation shaft disposed concentrically and interiorly of the tilting shaft 19 and coupled to the output shaft 16f of the differential speed reduction device 16 through bevel gears 22 and 23. Reference number 24 designates a flange mounted on the tool rotation shaft 21 for mounting a tool.

In effect, the first input shaft 2 driven at a reduced speed by a drive section and passing through the interior of the arm 1, rotates the wrist seat 4, while the second and third input shafts 9 and 10 are disposed within the arm 1 operatively at a high speed. The second input shaft 9 causes the differential speed reduction device 15 to operate via the bevel gears 11 and 17, and in turn causes the tilting shaft 19 to move about the speed reduction shaft 13. At this time, since the wrist cover 6 is divided obliquely relative to the axis of the arm, and the tilting shaft 19 is arranged at one side of the wrist cover 6b, so the tilting shaft 19 causes the cover 6b to turn around through the bearing 7 in the same direction as that of the tilting shaft 19, and also causes the cover 6a to turn around through the bearing 8 by a component force along the direction of the speed reduction shaft. Thus, the tilting shaft 19 tilts as a low speed while retaining a perpendicular relation to the speed reduction shaft.

Further, with the third input shaft 10 driven at a high speed, the differential speed reduction device 16 causes the bevel gear 22 to rotate at a low speed through the bevel gears 12 and 18. The bevel gear 23 meshing with the bevel gear 22 causes, the tool rotation shaft 21 and hence the flange 24 for mounting a tool, to be driven into rotation at a low speed.

The wrist mechanism described above, however, can not be always in good condition because the two divided wrist covers 6a and 6b may cause malfunction. More in detail, among various relative positions of the shafts for driving a wrist, there is a relation when the axis of the first input shaft for effecting rotation shown by an arrow a in FIG. 1 and the axis of the tool rotation shaft for effecting rotation shown by an arrow c in FIG. 2 coincide with each other. At this time, since the bearing 20 and the bearing 8 have the same rotation axis, the wrist cover 6 shown in FIG. 2 comes to a state free to rotate.

The divided wrist covers 6a and 6b at the state shown in FIG. 2 can be rotated as one integral body by hand along the rotary direction with respect to the bearings 20 and 8, and can also be stopped by hand at any position as desired.

In this free state, it is assumed here that the tilting or bending plane defined by a tilting or bending direction b of the second input shaft and a division or separated plane 6c of the cover 6 are caused to intersect at a right angle, by giving a suitable rotation amount to the covers 6a and 6b. When the second input shaft is actuated under the above condition, then the cover 6 is brought into a dead point so that the function thereof can not be obtained and the breakage may happen.

The critical condition explained above have been introduced by using hand. in practice, however, there is an ample possibility that such a dead point condition may occur to damage the cover 6. For example, upon application of any external force through cables of a tool or the like attached to the end of the arm, the cover 6 under the above mentioned free state may be led to the dead point condition.

SUMMARY OF THE INVENTION

It is an object of the invention to provide an industrial robot which enables to eliminate the problems with the conventional apparatus and is provided with a stopper at a fixed side relative to a cover.

According to the present invention, there is provided a wrist mechanism for an industrial robot of the type that two sets of differential speed reduction devices are provided within a wrist and arranged symmetrically of and perpendicularly to the axis of an arm and that the adjustment of the angle of the wrist and the rotation of a tool are carried out through the differential speed reduction devices, and in which the wrist mechanism comprises a guide protrusion and a guide. The guide protrusion is provided on the side of a bracket related by one of wrist covers on a wrist portion side, the side being located outside a speed reduction shaft and on the side of the wrist portion relative to the axis of an input shaft. The guide is provided on the inner face of the wrist cover at a point on a locus of the guide protrusion relative to the wrist cover, the point being defined by that at least the axes of a tool rotation shaft and input shafts coincide with each other.

DETAILED DESCRIPTION OF THE INVENTION

Figure 1:
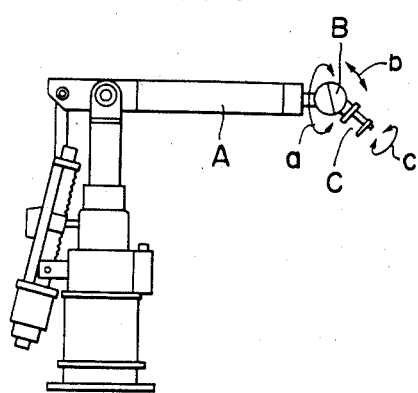
FIG. 1 is a side view showing a whole robot incorporating the present invention.
Figure 3:
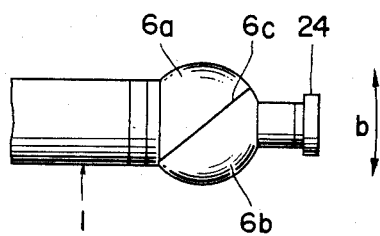
FIG. 3 is a side view of a wrist portion under malfunction.
Figure 2:
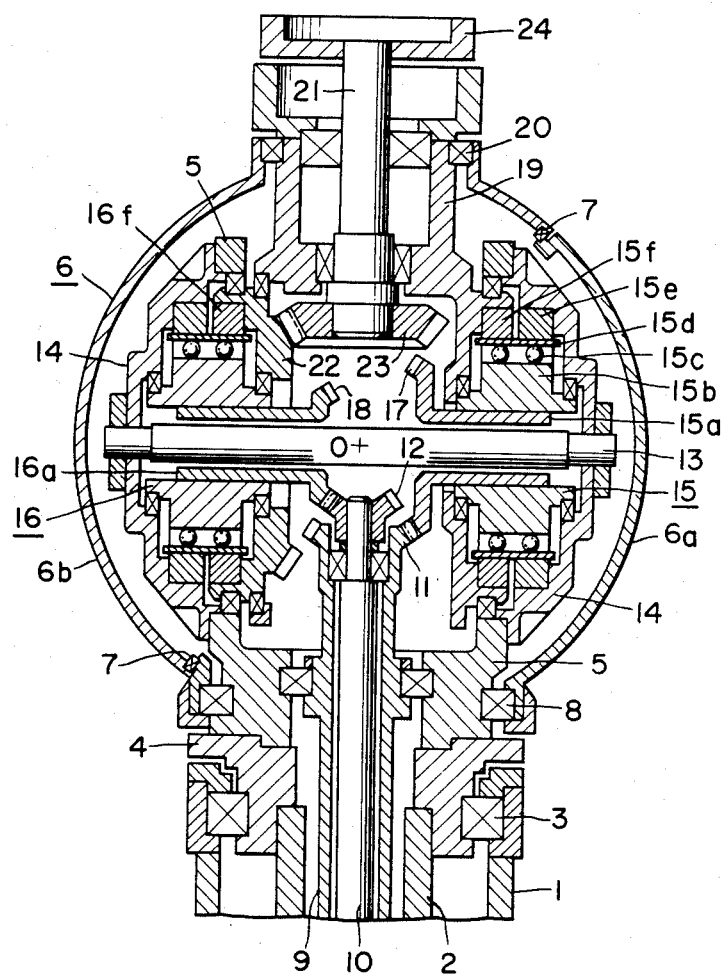
FIG. 2 is a cross-sectional side view of a mechanism according to a prior art.
Figure 4:
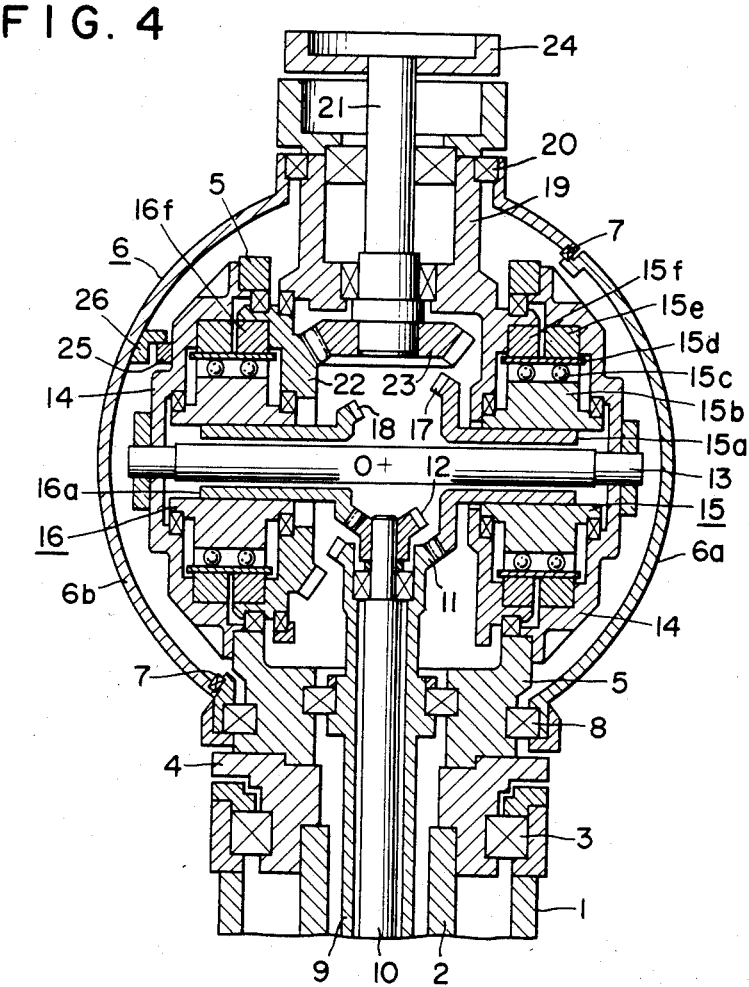
FIG. 4 is a cross-sectional side view of an embodiment according to the present invention.

In FIG. 4, one of the embodiments according to the present invention is shown as a cross-sectional side view. In all of the figures, the identical reference number has been used for designating the same or corresponding parts.

Figure 5:
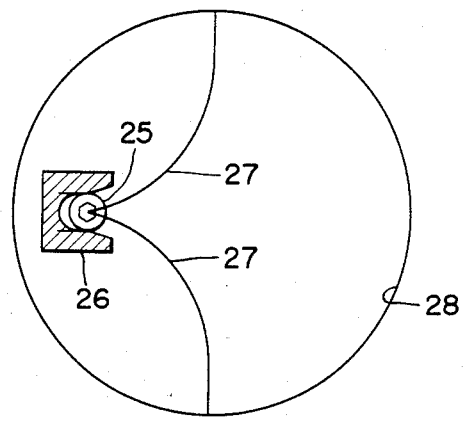
FIG. 5 is a plan view of the main part or stopper mechanism of FIG. 4.
Figure 6:
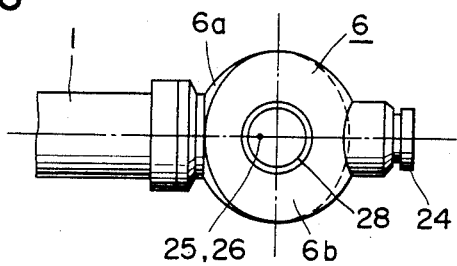
FIGS. 6 to 9 are side views illustrating the change of wrist tilting in another embodiment according to the present invention.
Figure 7:
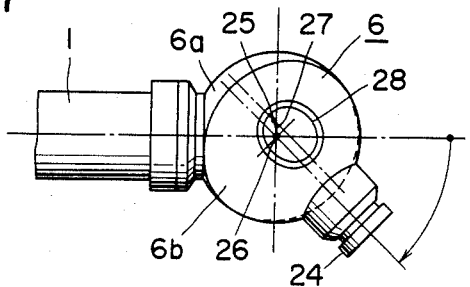
Figure 8:
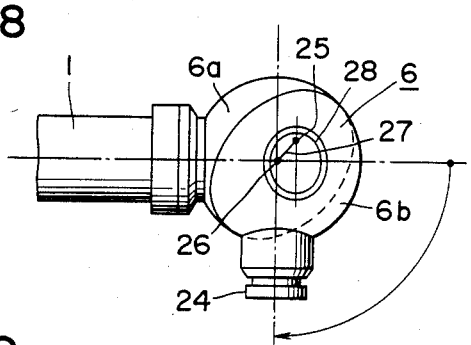

FIG. 5 is a plan view of a stopper mechanism for a spherical cover which is a main part of the present invention.

A guide protrusion 25 is formed on the side of a bracket 14 related by a wrist cover 6b which is associated with a wrist portion. The side of the bracket 14 is located outside a speed reduction shaft 13 and on the side of the wrist portion relative to the axis of an input shaft.

A guide 26 is provided on the inner face of the wrist cover 6b which is associated with the wrist portion, at a locus point on a locus of the guide protrusion 25 relative to the wrist cover 6. The locus point is defined by that at least the axes of the tool rotation shaft 21 and the input shafts 2 and 9 coincide with each other.

In the case when the second input shaft 9 is moved a little at a time, the locus 27 of the center of the guide protrusion 25 is obtained to have a specific shape as shown in FIG. 5.

The locus 27 has a point of inflection where the axes of the tool rotation shaft 21 and the first input shaft 2 are aligned in a straight line, the point of inflection having an arcuate angle at its tip portion.

The characteristic feature of the locus 27 has been used for mating the guide protrusion 25, mounted as shown in the figure, with the guide 26.

By virtue of the arrangement of the guide protrusion 25 and the guide 26, under the condition that the axes of the tool rotation shaft 21 and the first input shaft 2 are on the same shaft axis, the divided cover 6b is constrained in motion. Therefore, the divided cover 6b can not rotate freely. Here, the free rotation of the conventional problem can be prevented. In addition, in other various mutual conditions between the tool rotation shaft 21 and the first input shaft 2, the guide protrusion 25 and the guide 26 separate from each other, and the motion of the cover 6 is not constrained.

Another embodiment according to the present invention is shown in the side views shown in FIGS. 6 to 9.

Figure 9:
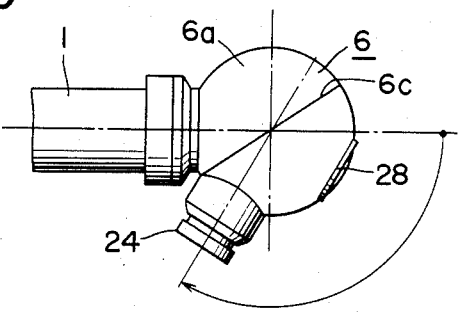

In this embodiment, a check window 28 is formed in the divided cover 6b, and the guide 26 is mounted on the check window cover. The check window 28 is here covered with transparent glass in order to enable to look at the interior. Upon actuating the second input shaft 9 so as to move the tool rotation shaft downward as shown progressively in FIGS. 6 to 8, the cover 6 ultimately reaches its operation limit as shown in FIG. 9.

The locus 27 shown in FIG. 5 may be obtained by looking from the outside and by plotting on the cover 6b the central positions of the guide protrusion 25 as they change with the movement of the cover 6.

As seen from FIGS. 6 to 9, when the cover is moved below the position where the second input shaft 9 takes a horizontal position, the locus 27 appears on the upper half of the check window 28. And when the cover is moved over the position where the second input shaft 9 takes a horizontal position, the completely symmetrical locus 27 appears on the lower half of the check window. Therefore, it is seen that the locus 27 has a point of inflection as shown in FIG. 5 at the positions (FIGS. 4 to 6) where the guide protrusion 25 and the guide 26 mate with each other. Thus, according to the present invention, the cover 6 can be locked only at the point of inflection.

As appreciated, according to the present invention, it is possible to attain a mechanical stopper mechanism which can fully and readily solve the problem which may occur with a small light-weighted industrial robot. Thus, the reliability of the operation of the wrist mechanism for an industrial robot can absolutely be established, and the productivity through the robot can be largely improved.

What is claimed is:

1. In a wrist mechanism for an industrial robot in which a tool is mounted at the end of an arm through the wrist mechanism, and in which the wrist mechanism comprises:

a first input shaft rotating at a reduced speed for rotating the whole wrist;

a second input shaft for tilting a wrist portion;

a third input shaft for rotating the tool; said first, second, and third input shafts being mounted within the arm and the axes thereof being aligned in the same shaft axis line;

a wrist cover which is generally of a spherical shape and is divided into two parts by a divisional plane which forms an oblique angle with said input shaft axes, said parts being rotatable relative to the divisional plane, one of the parts of the divided wrist cover being rotatably mounted on a wrist seat and the other part of the divided wrist cover having a tilting shaft and a tool rotation shaft mounted thereon;

a speed reduction shaft journaled at opposite ends thereof by a pair of brackets disposed facing each other and one of each of the parts of the wrist cover, said speed reduction shaft being perpendicular to said input shaft axes and coupled to said first input shaft;

differential speed reduction devices mounted about opposite ends of said speed reduction shaft respectively; and said tilting shaft for the wrist mechanism and the tool rotation shaft being aligned in the same shaft axis line passing through an intersecting point between the axes of said input shafts and said speed reduction shaft; and said speed reduction shaft, differential speed reduction devices, tilting shaft, and rotation shaft being mounted within said wrist cover, a guide protrusion provided on the side of the bracket facing said other part of the divided wrist cover; and a guide provided on the inner face of said other part of the divided wrist cover at a point on a locus of the path of said guide protrusion relative to said other part of the wrist cover so as to engage said guide protrusion to prevent relative free rotation between the wrist cover parts, said point being defined so that at least the axes of said tool rotation shaft and input shafts coincide with each other.

* * * * *